(12) United States Patent
Niemiec et al.

(10) Patent No.: US 11,829,904 B2
(45) Date of Patent: Nov. 28, 2023

(54) ON-DEMAND TRANSPORT SELECTION PROCESS BASED ON PICK-UP/DROP-OFF ZONE UTILIZATION

(71) Applicant: Uber Technologies, Inc., San Francisco, CA (US)

(72) Inventors: Konrad Julian Niemiec, Mountain View, CA (US); Jay A. Chen, Fremont, CA (US); Shenglong Gao, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 17 days.

(21) Appl. No.: 16/948,484

(22) Filed: Sep. 21, 2020

(65) Prior Publication Data

US 2021/0097452 A1     Apr. 1, 2021

Related U.S. Application Data

(60) Provisional application No. 62/907,020, filed on Sep. 27, 2019.

(51) Int. Cl.
*G06Q 10/02* (2012.01)
*G06Q 10/06* (2023.01)
(Continued)

(52) U.S. Cl.
CPC ....... *G06Q 10/02* (2013.01); *G06Q 10/06315* (2013.01); *G06Q 30/0283* (2013.01); *G06Q 30/0605* (2013.01); *G06Q 50/30* (2013.01)

(58) Field of Classification Search
CPC .... G06Q 10/02; G06Q 30/0283; G06Q 50/30; G06Q 10/06315; G06Q 30/0605
(Continued)

(56) References Cited

U.S. PATENT DOCUMENTS 10,522,037 B1 * 12/2019 Batra ..................... G08G 1/065
2017/0220966 A1 * 8/2017 Wang ................... G06Q 20/322
(Continued)

OTHER PUBLICATIONS

Burns, et. al.; "Reinventing the Automobile: Personal Urban Mobility for the 21st Century; New Mobility Markets"; Jan. 1, 2010. (Year: 2010).*

*Primary Examiner* — Dione N. Simpson
(74) *Attorney, Agent, or Firm* — Schwegman Lundberg & Woessner, P.A.

(57) ABSTRACT

Aspects of the present disclosure include systems, methods, and devices to auction-based on-demand transport selection. A transport request is received from a requesting user of a transport service region. A subset of transport providers to service the transport request are determined from transport providers that service the transport service region. A transport provider is selected to service the transport request based in part on a combination of a proposed cost to service the transport request and a proposed price to be paid in exchange for utilizing one or more pick-up/drop-off zones (PDZs) in servicing the request. The proposed cost to complete the transport request and the proposed price to be paid for utilizing one or more PDZs are specified by the transport provider. A transport assignment is transmitted to the selected transport provider to cause the selected transport provider to service the transport request.

20 Claims, 7 Drawing Sheets

(51) Int. Cl.
*G06Q 30/02* (2023.01)
*G06Q 30/06* (2023.01)
*G06Q 50/30* (2012.01)
*G06Q 30/0283* (2023.01)
*G06Q 10/0631* (2023.01)
*G06Q 30/0601* (2023.01)

(58) Field of Classification Search
USPC .............................................................. 705/5
See application file for complete search history.

(56) References Cited

U.S. PATENT DOCUMENTS

| | | | | |
|---|---|---|---|---|
| 2017/0316696 | A1* | 11/2017 | Bartel | G08G 1/202 |
| 2017/0351977 | A1* | 12/2017 | Bijor | G06Q 10/02 |
| 2017/0352125 | A1* | 12/2017 | Dicker | G06Q 50/30 |
| 2019/0251762 | A1* | 8/2019 | Mannan | G07C 5/008 |
| 2019/0325546 | A1* | 10/2019 | Hagestad | G06Q 50/30 |
| 2019/0347754 | A1* | 11/2019 | Dicker | G06Q 30/0208 |
| 2020/0311846 | A1* | 10/2020 | Chen | G06Q 50/30 |

* cited by examiner

ON-DEMAND TRANSPORT SELECTION PROCESS BASED ON PICK-UP/DROP-OFF ZONE UTILIZATION

CLAIM FOR PRIORITY

This application claims the benefit of priority of U.S. Application Ser. No. 62/907,020, filed Sep. 27, 2019, which is hereby incorporated by reference in its entirety.

TECHNICAL FIELD

The subject matter disclosed herein relates to transport services. In particular, example embodiments may relate to devices, systems, and methods for auction-based on-demand transport selection.

BACKGROUND

Vehicle ride-sharing and delivery platforms connect requesting users with available transport service providers within any given transport service region (e.g., a metroplex such as the San Francisco Bay Area). For example, users can launch a ride service application on their mobile computing devices, which can enable them to configure and submit transport requests for a ride or delivery of goods to any destination address within the transport service region. A backend computing system can process any given request by matching the user with a proximate available transport service provider to provide the requested transport services.

Some vehicle ride-sharing and delivery platforms may allow autonomous or semi-autonomous vehicle (collectively referred to as AVs or a self-driving vehicles (SDVs)) to provide transport services. An AV is a vehicle that is capable of sensing its environment and operating some or all of the vehicle's controls based on the sensed environment. An AV includes sensors that capture signals describing the environment surrounding the vehicle. The AV processes the captured sensor signals to comprehend the environment and automatically operates some or all of the vehicle's controls based on the resulting information.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
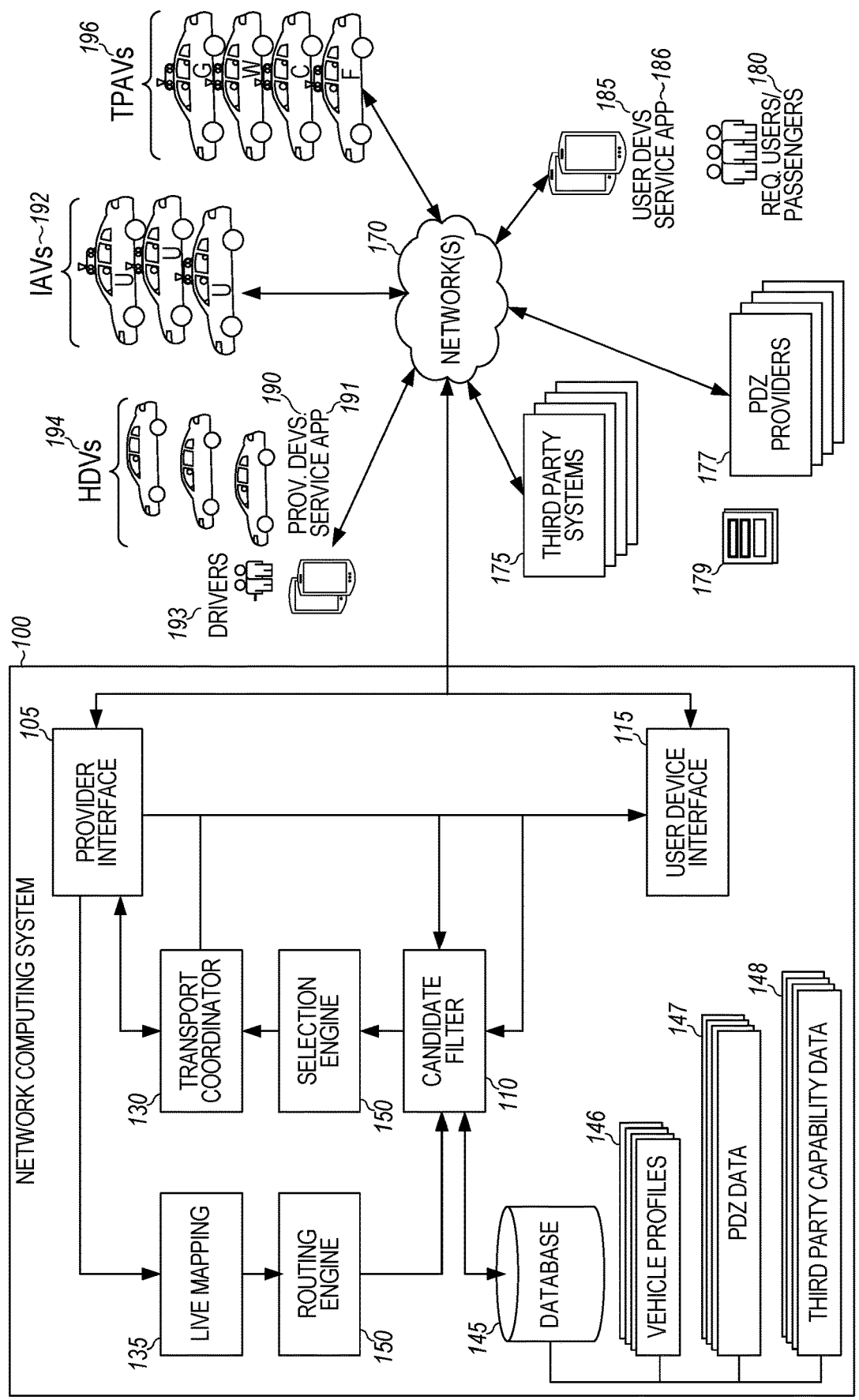
FIG. 1 is a block diagram illustrating an example computing system in communication with users and transport providers, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address systems, methods, and devices to manage and coordinate a vehicle ride-sharing platform. A network computing system can include a communication interface communicating over one or more networks with computing devices of requesting users and transport providers throughout a transport service region. For example, the communication interface can comprise an application programming interface that links the network computing system to transport service applications executing on computing devices, such as mobile computing devices (e.g., smartphones, wearable computing devices, tablet computers, augmented reality devices, personal computers, etc.), and on-board computing systems of vehicles (e.g., AVs). The designated transport service application can comprise a vehicle-ride sharing platform managed and coordinated by an on-demand transport service entity that administrates the network computing system described throughout the present disclosure.

As provided herein a "third-party AV" comprises an AV managed, operated, or provided by a third-party entity distinct from the provider of the vehicle ride-sharing platform. An "internal AV" comprises an AV managed or provided by the provider of the vehicle ride-sharing platform. For example, the vehicle ride-sharing platform can be managed and coordinated by UBER TECHNOLOGIES, of San Francisco, Calif., which can manage its own fleet of internal AVs owned, leased, and or otherwise operated by UBER. According to embodiments provided herein, the network computing system can facilitate third-party AVs in providing ride-sharing services throughout the transport service region. In doing so, the third-party AVs can execute the transport service application administered by the on-demand transport service entity that corresponds to the network computing system. Execution of the transport service application can cause the third-party AV to transmit location data to the network computing system, which enables the computing system to track the location of third-party AV throughout the transport service region and include the third-party AV in candidate sets of vehicles available to service transport requests from users.

Numerous challenges exist with the incorporation of third-party AV fleets into an on-demand transport service which provides its own internal fleet of AVs, and in various examples, incorporates human-driven vehicles into any given candidate set of transport providers competing to service a given transport request. For example, on-board routing software and operational autonomy grids of third-party AVs (e.g., a mapped road network on which the third-party AVs are operational) may differ from that of internal AVs. Furthermore, such on-board routing software and autonomy maps may remain proprietary despite the common use of a ubiquitous ride-sharing application as a platform for providing on-demand transport services. Other challenges can include trust in third-party AV capability in servicing a given ride request on a given route, and reliability of third-party AVs in completing matched rides for the user base of the on-demand transport service.

In an AV, a vehicular autonomy system controls one or more of braking, steering, or throttle of the vehicle. The vehicular autonomy system can control an AV along a route to a target destination. A route is a path that the AV takes, or plans to take, over one or more roadways. In some examples, the target destination of a route is associated with one or more pick-up/drop-off zones (PDZs). A PDZ is a location where the AV can legally stop, for example, to pick-up or drop-off one or more passengers, pick-up or drop-off one or more pieces of cargo, recharge, download new data, wait for further service request, wait for other autonomous vehicles or otherwise pull over safely. In some examples, the AV can be used to provide transport services such as a ride service for passengers or to provide a delivery service of food or other purchased items. Accordingly, in some examples, a PDZ can be a place where the AV can pick-up or drop-off a passenger. In other examples, the AV can be used to provide a delivery service of food or other purchased items. A PDZ can be a place where the AV parks to pick up an item or items for delivery or a place where the AV can make a delivery of an item or items to a customer. Non-limiting examples of PDZs include parking spots, driveways, roadway shoulders, and loading docks.

A PDZ may not be useable by every AV. That is, in some instances, an AV may be permitted to use only specific PDZs. For example, policy and contractual obligations may limit which PDZs a service provider's vehicles may utilize. Moreover, in some other instances, only certain AVs may have the operational capabilities to utilize a PDZ. For example, a particular PDZ may require parallel parking to be utilized, and certain AVs may not be capable of parallel parking. In many applications, the vehicular autonomy system itself does not know if it is permitted or capable of using a particular PDZ. Tracking and locating usable PDZs is a complex and challenging problem for AVs that can needlessly consume time that could otherwise be spent providing additional ride or delivery services.

To address and overcome these challenges, a network computing system can coordinate on-demand transport for a transport service region based on usability and utilization costs of PDZs by vehicles providing the transport services. According to examples described herein, the network computing system can receive transport requests from requesting users in the transport service region. In various examples, a transport request can indicate a pick-up location and a destination. For a given transport request, the network computing system can determine a subset of transport providers as candidates to service the respective transport request. This subset can comprise any number of internal AVs, third-party AVs, and/or human-driven vehicle, and may be determined based on a proximity to the pick-up location (e.g., a radius of two miles), an estimated time of arrival (ETA) to the pick-up location (e.g., given current traffic conditions and routing), estimated time to drop-off of the requesting user (ETD), and/or supply-demand conditions proximate to each transport provider in the vicinity of the pick-up location.

In various examples, once the subset of transport providers is determined, the network computing system can execute a selection process among the subset of the transport providers to ultimately select a transport provider to service the transport request. In certain aspects, the selection process can comprise an auction in which a variety of utility metrics are considered to determine an optimization score for each transport provider in the subset. Depending on the classification of each transport provider (e.g., whether the transport provider is an internal AV, third-party AV, or human-driven vehicle), the utility metrics for determining the optimization score can vary. For example, the utility metrics for a human-driven vehicle can comprise an earnings amount for the driver, and an ETA and/or ETD for rendezvousing with and/or dropping off the requesting user. For a third-party AV, the utility metrics can comprise information gathered from a service response from the third-party AV, such as a proposed route, a cost for servicing the transport request, a proposed price for utilizing one or more PDZs associated with the transport request, and the reliability of the vehicle and/or autonomous navigation systems, as well as the ETA and ETD of the third-party AV. For internal AVs, the utility metrics can further include values for testing or certifying new software versions, new hardware, new routes, and/or new vehicles.

The network computing system may include a PDZ tracking system to create and maintain associations between vehicles and PDZs to track, which PDZs may be utilized by a requesting AV at particular locations. The PDZ tracking system may, for example, create an association between a set of PDZs and a fleet of third-party AVs. The PDZ tracking systems creates associations between AVs and PDZs based on registration data that may, for example, be received from a transport service provider that operates one or more fleets of third-party AVs. The registration data may include a fleet identifier that may be associated with a fleet of vehicles. The registration data further comprises at least one of a set of PDZs for association with the vehicle identifier or operational capabilities of vehicles associated with the vehicle identifier. As an example, a transport service provider may have certain ownership of or license to use a set of PDZs and the transport service provider may register a fleet of vehicles so as to enable access to the set of PDZs. The transport service provider may allow other fleets or other transport service providers to utilize one or more PDZs. For example, the registration data may further include an indication that one or more PDZs may be utilized by other fleets or other transport services and may further specify a minimum expected price to be paid in exchange for utilizing one or more PDZs.

Factoring in each of the utility metrics for each transport provider in the subset, the network computing system can determine an optimization score of each of the transport providers in the subset, rank the subset accordingly, and select a transport provider to service the transport request based on the ranking (e.g., a vehicle having the highest optimization score). The network computing system may then transmit a transport assignment to the selected transport provider to cause the selected transport provider to service the transport request. In various examples, the service queries transmitted to the candidate third-party AVs for any given transport request can comprise an auction process (e.g., such as a Dutch auction) whereby the third-party AVs submit a cost for servicing the transport request and a proposed price for utilizing one or more PDZs associated with the transport request. The action process may, for example, enable the network computing system to gauge whether any of the third-party AVs will be able to service the transport request more competitively or with higher optimization score than an internal AV or a human-driven vehicle.

It is further contemplated that any transport provider, whether human or AV, can respond to a transport assignment or invitation in the negative. For example, the network computing system can transmit transport invitations sequentially based on the ranked set of transport providers and receive a series of one or more negative responses until a transport provider responds in the affirmative. In this arrangement, the network computing system can match the first affirmatively responding transport provider in the ranked set to the transport request. Thereafter, the network computing system can monitor the en route progress of the transport provider to the rendezvous location with the requesting user, provide or facilitate remote assistance if needed, and facilitate a multi-trip ride to rendezvous with the user if the third-party or internal AV fails to complete the trip.

As provided herein, a transport request can comprise a request for passenger transport, comestible goods delivery, package or mail delivery, and the like. Accordingly, the network computing system described herein can apply classification filters to determine the candidate set of transport providers for any given request. In addition to being classified as a human-driven vehicle, an internal AV, or a third-party AV, each transport provider can be classified as one or more of a passenger transport provider, a food delivery provider, a package delivery provider, a mail delivery provider, and the like. Thus, when tracking transport providers throughout the given region, the network computing system can utilize the provider classifications in pre-filtering the transport providers for any given transport request.

Among other benefits, the examples described herein achieve a technical effect of incorporating third-party AVs and PDZs into a single vehicle ride-sharing platform. Through inclusiveness of a diverse field of AVs, the network computing system described herein may support convergence towards safer, more efficient, and more cost-effective solutions to the current challenges in autonomous driving technology. Furthermore, the selection processes based on the optimization scores described herein achieve an effect of routing transport supply efficiently and homogeneously throughout the transport service region to flatten transport and PDZ supply-demand conditions over the entire region.

FIG. 1 is a block diagram illustrating an example network computing system 100 in communication with users and transport providers, in accordance with examples described herein. The network computing system 100 shown and described with respect to FIG. 1 can coordinate on-demand transport for a transport service region (e.g., a metropolitan area) by receiving transport requests from requesting users 180 and matching the transport requests with available transport providers. In various implementations, the network computing system 100 can include a user device interface 115 that connects with user devices 185 over one or more networks 170 via an executed service application 186 on the user devices 185. For example, a requesting user 180 can launch the service application 186 on the user device 185 to configure and transmit transport requests to the network computing system 100. The network computing system 100 can receive the transport requests at the user device interface 115. The network computing system 100 can further include a provider interface 105 that connects the network computing system 100 with various PDZ providers 177 and transport providers. The transport providers comprise human drivers 193 operating human-driven vehicles 194, a fleet of internal AVs 192 associated with the on-demand transport service managed by the network computing system 100, and any number of fleets of third-party AVs 196 owned, managed, and/or provided by any number of third-party entities.

In various examples, the provider interface 105 can connect with provider devices 190 of human drivers 193 via an executed transport service application 191 on those devices 190. Additionally, the provider interface 105 can connect with the computing system of the internal AVs 192 and third-party AVs 196 based on a transport service application executing on the on-board computing systems of those AVs 192, 196. The various transport providers can transmit location data (e.g., GPS location pings) to the network computing system 100 to enable the network computing system 100 to track the locations of the transport providers as they operate throughout the transport service region. For example, the network computing system 100 can include a live mapping engine 135 that tracks the dynamic locations of the transport providers on map data as they operate throughout the region. The provider interface 105 can further connect with computing systems of PDZ providers 177 based on a PDZ provider application executing on these computing systems.

According to certain implementations, the network computing system 100 can include a candidate filter 110 that can process the transport requests received from the requesting users 180 and determine a set of candidate transport providers that can potentially service the transport request. For example, the candidate filter 110 can prefilter or eliminate any transport providers that are not within a threshold distance and/or projected time to the current location of the requesting user 180 or an inputted pick-up location indicated in the transport request. Accordingly, the candidate filter 110 can receive location data from the transport providers, and in certain variations, can further determine routing information for each remaining transport provider. For example, the network computing system 100 can include a routing engine 150 that can determine the most optimal routes of each transport provider in a candidate set of transport providers to rendezvous with the requesting user. Based on the routing data from the routing engine 150, the candidate filter 110 can determine estimated arrival times for each of the candidate transport providers.

In various examples, the candidate filter 110 can further communicate with each candidate transport provider to determine a capability of that transport provider in servicing the transport request. In some aspects, the candidate set of transport providers can include any combination of human-driven vehicles 194, internal AVs 192, and/or third-party AVs 196. If the candidate set includes a number of third-party AVs 196, then the candidate filter 110 can transmit a service query to each of the third-party AVs 196 to determine whether they are capable of servicing the transport request, and a proposed route and cost to complete the transport request. In doing so, the candidate filter 110 can transmit the pick-up location, the user's current location, a drop-off location, and/or a mandated route between the pick-up location and drop-off location. On board the third-party AV 196, the control system of the AV 196 can determine whether the AV 196 is capable, and if so, can transmit an affirmative response back to the candidate filter 110.

In certain examples, the third-party AV 196 can also transmit contextual information regarding a route plan, estimated time of completion, estimate cost of completion, proposed price to be exchanged for PDZ utilization, and the like. In variations, the candidate filter 110 can transmit service queries to third-party systems 175 corresponding to fleet management or ownership entities that provide the respective third-party fleets for transport services. In further variations, the candidate filter 110 can transmit service queries to the third-party systems 175 to generally determine whether a particular third-party AV 196 can service a given transport request, and if so, the candidate filter can transmit a confirmation query to the third-party AV 196 to specifically determine whether that particular AV can service the request (e.g., given local conditions on the AV, such as fuel or power, a current number of passengers, and the like).

Additionally or alternatively, the network computing system 100 can include a database 145 that stores vehicle profiles 146 and/or third-party AV capability data 148 (e.g., on-board routing software information from third-party AVs 196) indicating whether a corresponding third-party AV 196 is capable of servicing a particular transport request. The database 145 may additionally store PDZ data 147 comprising a plurality of PDZ objects. Each PDZ object is a data structure that comprises data that describes a PDZ such as an identifier, a location (e.g., geographic coordinates), geometry, dimensions, predetermined associations with certain locations, associations with other PDZ (e.g., a cluster definition), and legal restrictions on utilizing the PDZ. A PDZ object may further include an indication of one or more operational constraints for utilizing the corresponding PDZ. An operational constraint comprises an operational capability that is needed to utilize the PDZ. Example operational constraints relate to operating in reverse, performing parallel parking, or using particular PDZ geometries or dimensions. In such examples, the candidate filter 110 can reference the third-party capability data 148, vehicle profiles 146, and/or PDZ data 147 to filter out incapable third-party AVs to output a filtered set of transport providers.

PDZs represented by PDZ objects in the database 145 may be owned, operated, or licensed by a PDZ provider 177. A PDZ provider 177 may be a ride-sharing platform, a transport provider, or another entity that owns, operates, or licenses the PDZ. A PDZ object may include a minimum expected price for utilizing the PDZ. The minimum expected price may be specified by a PDZ provider associated with the PDZ. For example, the network computing system 100 may provide functionality to one or more PDZ providers 177 via the provider interface 105 to register one or more PDZs with the network computing system 100 for use by one or more transport providers. In registering one more PDZs, a PDZ provider may provide registration data 179 to the network computing system 100. The registration data 179 comprises data describing one or more PDZs such as PDZ identifier, a geographic location (e.g., latitude and longitude), one on more associated locations for which the PDZ may be used for pick-up and drop-off operations, and a PDZ geometric. The registration data 179 may further specify a minimum expected price for each PDZ. The minimum expected price may be a per-use rate or a time-based rate. The registration data 179 may further specify which transport providers are permitted to use a PDZ and in some instances, the registration data 179 may specify a separate minimum expected price for different transport providers that are permitted to use a given PDZ.

According to various implementations, the candidate filter 110 can output a filtered set of candidate transport providers to a selection engine 120 of the network computing system 100 based on the service responses from the third-party AVs 196 or the third-party systems 175. In certain aspects, the filtered set of transport providers can list each candidate vehicle with identifying information (e.g., type of vehicle, human-driven, internal AV, or third-party AV), an estimated time of completion, an estimated distance or time from the pick-up location, and the like. The candidate filter 110 may also provide service response information from the third-party AVs in the candidate set, such as the proposed routes (e.g., to the pick-up location and to the destination), the proposed cost of completion, and a proposed price for utilizing one or more PDZs in servicing the request.

In certain implementations, the candidate filter 110 can initiate an auction process with the third-party AVs in the candidate set, such as a Dutch auction in which an initial price for servicing the transport request and/or utilizing one or more PDZs is proposed, and the third-party AVs 196 bid on the transport request, use of the one or more PDZs in servicing the request, or a combination of both. In an example, the candidate filter 110 can determine an initial price for completing the transport request based on historical data of internal AVs 192 and/or human-driven vehicles 194 servicing similar transport requests (e.g., based on distance and estimated time of completion). In one aspect, the candidate filter 110 can filter out all third-party AVs except for the lowest price AV, which can comprise the winner of the Dutch auction.

In another example, the candidate filter 110 can determine an initial price for one or more PDZs associated with servicing a request (e.g., one or more PDZs associated with a pick-up location and one or more PDZs associated with a destination location) based on a minimum expected price specified in one or more PDZ objects stored in the database 145. The candidate filter 110 can filter out all third-party AVs except for the AV that has proposed the highest price for PDZ utilization, which can comprise the winner of the Dutch auction.

In yet another example, the candidate filter 110 can determine an initial price for completing the transport request and an initial price for PDZ utilization associated with completing the transport request. The candidate filter 110 can filter out all third-party AVs 196 except for the AV that has proposed the most optimal combination of transport request completion price and PDZ utilization price, which can comprise the winner of the Dutch auction.

In these examples, third-party AVs 196 that do not meet the initial price (either for the transport request or PDZ utilization) proposed by the candidate filter 110 may be filtered out of the candidate set. In certain implementations, the candidate filter 110 can enter into negotiations with a corresponding trip negotiator of the third-party AVs 196 to determine the candidate set. The candidate filter 110 may then associate each of the remaining third-party AVs in the candidate set with its submitted prices for completing the transport request and utilizing PDZs, which, along with a proposed route, ETA, and ETD, can comprise a utility metric for the determination of the third-party AV 196's optimization score by the selection engine 120.

As described herein, selection of a transport provider in the candidate set can be based on the optimization score of each candidate. The network computing system 100 can include a selection engine 120 that determines an optimization score for each transport provider in the candidate set. In various aspects, the selection engine 120 can comprise processing resources (e.g., one or more processors, CPUs, GPUs, servers, datacenters, etc.), and can execute an instruction set, one or more algorithms, and/or a machine learning model to determine an optimization score for each transport provider in the candidate set based on a plurality of weighted utility metrics corresponding to and/or individual to the transport provider.

In certain implementations, each transport provider in a candidate set of transport providers can be classified as a human-driven vehicle 194, an internal AV 192, or a third-party AV 196. In some aspects, the transport providers may be further classified based on the available transport services provided (e.g., package delivery, comestible goods delivery, carpooling, luxury or professional transport services, high capacity vehicle service, and the like). The selection engine 120 can receive location and/or route data from each available and on-trip transport provider throughout the transport service region in order to determine the current supply conditions of each sub-region. For example, the entire transport service region can be parsed into any number of sub-regions, which can be evenly divided from the transport service region, or can vary in size based on such factors as population density, historical supply versus demand, and the like. For any given transport request that includes a pick-up location and destination, the selection engine 120 can determine a most optimal transport provider to service the transport request based on timing (e.g., ETA to the pick-up location and ETD to the destination given current or expected traffic conditions), earnings or cost (e.g., computed based on a proposed cost for completing a transport request, a proposed price to be paid in exchange for PDZ utilization, and a price to be paid to a PDZ provider), and a value associated with moving the transport provider from its current location within a particular sub-region to a sub-region that comprises the destination. For carpooling transport providers, the selection engine 120 can further factor in the addition of the pick-up location and destination as additional stops along an overall service route of the transport provider.

Based on the current location of each transport provider in the candidate set, the pick-up location and drop-off location of the transport request, the current transport supply versus transport demand conditions in the respective sub-regions of each transport provider in the candidate set, the transport supply versus transport demand conditions of the sub-regions corresponding to the pick-up location and the destination, the expected or predetermined earnings of the driver (e.g., for human-driven vehicles), the current PDZ supply versus PDZ demand conditions in the respective sub-regions of each PDZ provider, the PDZ supply versus PDZ demand conditions of the sub-regions corresponding to the pick-up location and the destination, the expected or predetermined cost for servicing the request for each third-party AV in the candidate set, the expected or predetermined cost of utilizing one or more PDZs, and/or the overall conditions of the transport service region (e.g., identifying proximate sub-regions that are oversupplied or undersupplied), the selection engine 120 can determine an optimization score for each transport provider in the candidate set.

In certain implementations, the selection engine 120 can generally weigh more heavily in favor of lower cost and lower ETA and ETD transport providers. Furthermore, the selection engine 120 can generally weigh more heavily in favor of distributing transport providers from oversupplied sub-regions to undersupplied sub-regions. In further implementations, the selection engine 120 can further weigh more heavily in favor of individual third-party AVs and third-party entities with a proven track record of safety and robust autonomous systems. Accordingly, the optimization score of transport providers that have a relatively lower ETA to the pick-up location, a relatively lower ETD to the drop-off location, and are currently located in a sub-region that is more oversupplied than the destination of the requesting user, will be greater than the optimization score of transport suppliers that have higher ETAs and ETDs, and are currently located in undersupplied sub-regions. Once the selection engine 120 determines an optimization score for each transport provider in the candidate set, the selection engine 120 can rank the transport providers according to their optimization scores (e.g., from highest to lowest), and output the ranked set of candidate transport suppliers to the transport coordinator 130 of the network computing system 100.

The transport coordinator 130 can operate to ultimately select and invite a transport provider to service the transport request from the ranked set transport providers. In various examples, the transport coordinator 130 can sequentially transmit transport invitations to each transport provider in the ranked set in the order of the ranking until a ranked transport provider accepts the invitation. For example, the transport coordinator 130 can initially transmit a transport invitation to a highest ranked transport provider, and receive an invitation response either accepting or rejecting the invitation. If accepted, the transport coordinator 130 can match the transport request from the requesting user 180 with the highest ranked transport provider and enter an on-trip status for both. If rejected, then the transport coordinator 130 can transmit the invitation to a next highest ranked transport provider, and so on until a highest ranked, accepting transport provider accepts the invitation. Once accepted, the transport coordinator 130 can transmit match data to each of the accepting transport provider and the requesting user 180, and facilitate the rendezvous between them.

In variations, the transport coordinator 130 can take a highest subset of the ranked transport providers (e.g., the top three) and transmit a simultaneous transport invitation to them. In further variations, the transport coordinator 130 initially transmits the transport invitation to only the internal AVs 192 and the third-party AVs 196 in the ranked set of transport providers, and receive a set of invitation responses from those AVs. If none accept, then the transport coordinator 130 can transmit the invitation to one or more of the human drivers 193 in the ranked set. However, if one or more AVs accept, then the transport coordinator 130 can select one of the AVs to service the transport request (e.g., a highest ranked affirmative respondent). Alternatively, if one or more AVs accept, the transport coordinator 130 can determine whether the accepting AVs are ranked higher or lower than a human driver 193. If the accepting AVs are ranked higher, then the transport coordinator 130 can select from the accepting AVs to service the transport request. However, if the accepting AVs are ranked lower than one or more human drivers 193, then the transport coordinator 130 can transmit the invitation to the computing devices 190 of the human drivers 193. If a human driver 193 accepts, then the transport coordinator 130 can match the accepting human driver 193 with the requesting user 180 that submitted the transport request.

As described herein, for any given transport request, the candidate filter 110 can compile third-party capability data 148 regarding the capability of third-party fleets in servicing individual transport requests including whether third-party fleets are capable of utilizing PDZs associated with transport requests (e.g., based on service responses received from the third-party AVs 196 and/or third-party systems 175). The third-party capability data 148 can indicate whether a whole fleet of third-party AVs should be disqualified or qualified as candidate vehicles for individual transport requests (e.g., based on a safety record). As an example, the third-party capability data 148 can describe autonomy road networks (e.g., lane-specific routes) that a third-party fleet of AVs is capable of servicing. The third-part capability data 148 in combination with PDZ data 147 may be used to determined which PDZs the third-party fleet of AVs is capable of utilizing. Thus, if a transport request requires a transport provider to travel outside the autonomy road network of a particular fleet or to utilize PDZs that a third-party fleet of AVs in incapable of utilizing, then the candidate filter 110 can disqualify all third-party AVs in that fleet. In addition, the selection engine 120 can factor experience and safety history of a third-party entity or third-party AV into the optimization score calculations.

In further examples, the candidate filter 110 can compile and access vehicle profiles 146 of individual third-party AVs 196. It is contemplated that AV technology may advance unevenly across fleets and within the fleets themselves. For example, AVs may run outdated software or carry outdated hardware, but may still be sufficiently reliable and safe for transport services. In various aspects, the vehicle profiles 146 can indicate the capability of individual AVs in servicing any given transport request. Accordingly, the candidate filter 110 can determine a candidate set of transport providers, comprising any combination of human-driven vehicles 194, internal AVs 192, and/or third-party AVs 196, and perform lookups of the vehicle profiles 146 of those candidate transport providers to determine whether each transport provider is individually capable of service the transport request. The selection engine 120 can perform lookups in the vehicle profiles to incorporate weighted utility metrics corresponding to the capability and/or safety of those individual vehicles (e.g., based on software, hardware, age of the vehicle, etc.).

It is contemplated herein that the utilization of the selection engine 120 in the selection process achieves a technical effect of remotely coordinating with and distributing transport supply across a given transport service region to effectively flatten supply conditions over the entire service region, add downward pressure on the cost of transport services, and bolster the safety of AV operations across multiple supplying entities. For example, the selection engine 120 can attribute higher optimization scores to vehicles in oversupplied regions, facilitating their general migration towards more undersupplied sub-regions.

Figure 2:
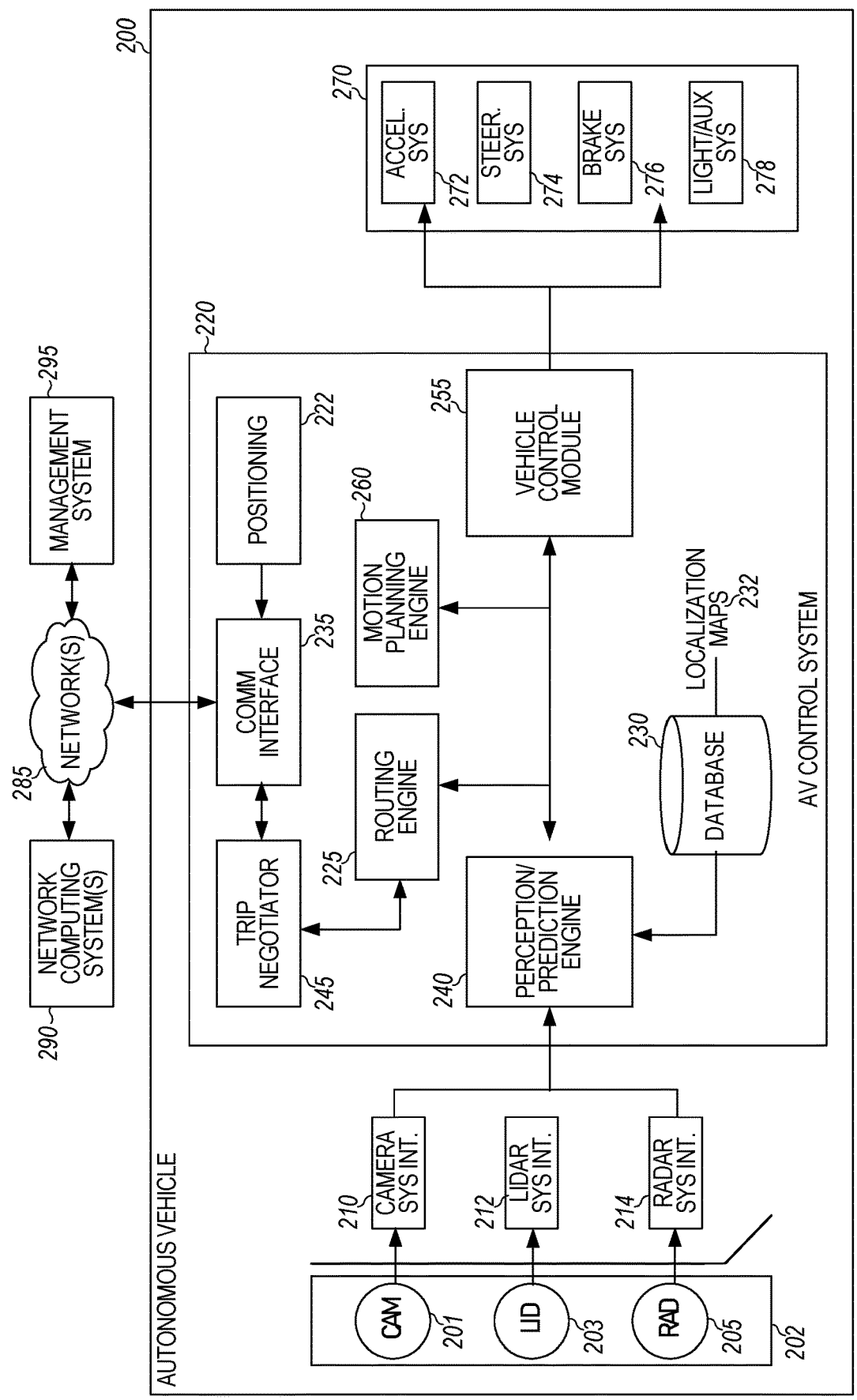
FIG. 2 is a block diagram depicting an example autonomous vehicle (AV) operated by a control system implementing a trip negotiator, according to some embodiments.

FIG. 2 is a block diagram illustrating an example AV 200 operated by a control system 220, according to examples described herein. In an example of FIG. 2, a control system 220 can autonomously operate the AV 200 in a given geographic region, and can perform transport services (e.g., transport of humans, delivery services, etc.). In examples described, the AV 200 can operate without human control. For example, the AV 200 can autonomously steer, accelerate, shift, brake, and operate lighting components without human intervention. In certain variations, the AV 200 can switch between an autonomous mode, in which the AV control system 220 autonomously operates the AV 200, and a manual mode in which a driver takes over manual control of the acceleration system 272, steering system 274, braking system 276, and lighting and auxiliary systems 278 (e.g., directional signals and headlights).

According to some examples, the AV control system 220 can utilize specific sensor resources in order to autonomously operate the AV 200 in a variety of driving environments and conditions. For example, the AV control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processors and/or field programmable gate arrays (FPGAs)) which operate to process sensor data received from a sensor system 202 of the AV 200 that provides a sensor view of a road segment upon which the AV 200 operates.

The sensor data can be processed to determine actions that are to be performed by the AV 200 in order for the AV 200 to continue along a current route to the destination. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands to control the various control mechanisms 270 of the AV 200, including the vehicle's acceleration system 272, steering system 274, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data from the sensor suite 202 and to control the various control mechanisms 270 in order to autonomously operate the AV 200. For example, the control system 220 can analyze the sensor data to generate low level commands executable by the acceleration system 272, steering system 274, and braking system 276 of the AV 200. Execution of the commands by the control mechanisms 270 can result in throttle inputs, braking inputs, and steering inputs that collectively cause the AV 200 to operate along sequential road segments to a particular destination.

In more detail, the sensor system 202 operates to collectively obtain a sensor view for the AV 200 (e.g., in a forward operational direction, or providing a 360 degree sensor view), and to further obtain situational information proximate to the AV 200, including any potential hazards or obstacles. By way of example, the sensor system 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors of the sensor system 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors of the sensor system 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors of the sensor system 202 can include a video camera and/or stereoscopic camera system 201, which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a sensor interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor system 202 collectively provides sensor data to a perception/prediction engine 240 of the AV control system 220. In various implementations, the perception/prediction engine 240 can access a database 230 comprising stored localization maps 232 of the given region in which the AV 200 operates. The localization maps 232 can comprise detailed ground truth data of each road segment of the given region. For example, the localization maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception/prediction engine 240 can access a current localization map of a current road segment to compare the details of the current localization map with the sensor data in order to detect and classify any objects of interest, such as moving vehicles, pedestrians, bicyclists, and the like.

In various examples, the perception/prediction engine 240 can dynamically compare the live sensor data from the AV's sensor systems 202 to the current localization map as the AV 200 travels through a corresponding road segment. The perception/prediction engine 240 can flag or otherwise identify any objects of interest in the live sensor data that can indicate a potential hazard. In accordance with many examples, the perception/prediction engine 240 can output a processed sensor view indicating such objects of interest to a vehicle control module 255 of the AV 200. In further examples, the perception/prediction engine 240 can predict a path of each object of interest and determine whether the AV control system 220 should respond or react accordingly. For example, the perception/prediction engine 240 can dynamically calculate a collision probability for each object of interest, and generate event alerts if the collision probability exceeds a certain threshold. As described herein, such event alerts can be processed by the vehicle control module 255 that generates control commands executable by the various control mechanisms 270 of the AV 200, such as the AV's acceleration, steering, and braking systems 272, 274, 276.

On a higher level, the AV control system 220 can include a motion planning engine 260 that provides the vehicle control module 255 with a motion plan and a travel trajectory along a current route to a destination. The current route may be determined by a backend transport system, or may be determined by the AV 200 via access to a local or external mapping service. In some aspects, the AV 200 can include a user interface, such as a touch-screen panel or speech recognition features, which can enable a passenger to input a destination. In some aspects, the AV 200 may communicate with an on-demand transport management system 295 that manages routing of any number of AVs operating throughout a given region to provide transportation services to requesting riders. Thus, the motion planning engine 260 may receive the destination from the on-demand transport system over the network(s) 285 in order to plan a current route for the AV 200.

In mapping the current route, the motion planning engine 260 can generally utilize an on-board mapping engine or an external mapping service by transmitting map calls over the network(s) 285 in order to determine a most optimal route plan from a current location of the AV 200 to the destination. This route plan may be determined based on distance, time, traffic conditions, additional pick-ups (e.g., for carpooling services), and the like. For each successive road segment on which the AV 200 travels, the motion planning engine 260 can provide trajectory data to the vehicle control module 255 to enable the vehicle control module 255 to operate the AV 200 safely to the next road segment or the destination. For example, the trajectory data can indicate that the vehicle control module 255 must change lanes or make a turn within the current localization map in order to proceed to the next road segment along the current route plan.

According to examples provided herein, the vehicle control module 255 can utilize the motion plan, the processed sensor view, and event alerts to autonomously operate the control mechanisms 270 of the AV 200. As an example, to make a turn based on the route plan, the vehicle control module 255 can generate control commands that cause the lights and auxiliary systems 278 of the AV 200 to activate the appropriate directional signal, the braking system 276 to slow the AV 200 down for the turn, the steering system 274 to steer the AV 200 into the turn, and the acceleration system 272 to propel the AV 200 when exiting the turn. In further examples, event alerts may indicate potential hazards such as a pedestrian crossing the road, a nearby bicyclist, obstacles on the road, a construction area, proximate vehicles, an upcoming traffic signal and signal state, and the like. The vehicle control module 255 can respond to each event alert on a lower level while, on a higher level, operating the AV 200 based on the motion plan determined by the motion planning engine 260.

According to examples described herein, the AV control system 220 can further include a routing engine 225, positioning module 222, and trip negotiator 245. The positioning module 222 can transmit positioning data (e.g., location pings) to the network computing system 290 to enable the computing system 290 to identify the AV 200 as a candidate for servicing transport requests. In doing so, the network computing system 290 can select the AV 200 as a candidate vehicle and as an optimal servicing vehicle to fulfill a given transport request in the manner described with respect to FIG. 1. The positioning module 222 can comprise one or more of a global positioning system (GPS) module, GLONASS module, DORIS chip, BeiDou COMPASS chip, GALILEO module, IRNSS module, QZSS, or any suitable satellite or ground positioning or navigation system.

In certain implementations, the routing engine 225 can access the localization maps 232 to determine a proposed route for servicing a particular transport request. For example, the network computing system 290 can transmit a capability inquiry to the trip negotiator 245, which can determine whether the AV 200 is able to service a given transport request, or in certain implementations, whether the transport request is desirable for the AV 200. In various aspects, given a received service query, the trip negotiator 245 can query the routing engine 225 for a proposed route to service the transport request. In further implementations, the trip negotiator 245 can communicate with a management system 295, corresponding to a third-party system 175 that manages or owns the AV 200, to determine whether the management system 295 identifies the transport request as desirable for the AV 200 (e.g., based on cost, location, routing information, etc.).

If the transport request is undesirable, then the trip negotiator 245 can transmit a rejection message to the network computing system 290 and await a next capability inquiry corresponding to another transport request. If the transport request is desirable, the trip negotiator 245 can transmit data back to the network computing system 290 that indicates the propose route, a proposed cost for servicing the transport request, and a proposed price to be paid in exchange for utilizing one or more PDZs in servicing the transport request. In some aspects, the trip negotiator 245 transmit additional information that indicates an estimated time of completion to service the transport request, and other parameters that may make the trip more desirable for the requesting user (e.g., any on-board amenities or features).

In various embodiments, the network computing system 290 can ultimately decide whether the AV 200 is suitable or optimal for servicing a given transport request. The network computing system 290 can transmit an initial capability inquiry to the communication interface 235, which can be processed by the trip negotiator 245. The trip negotiator 245 can transmit data indicating a proposed route, a proposed cost for servicing the transport request, and a proposed price to be paid in exchange for utilizing one or more PDZs in servicing the transport request, estimated completion time, and/or a confirmation or rejection that the AV 200 is capable of servicing the request back the network computing system 290 to assist the network computing system 290 in making a final decision. If the AV 200 is most optimal, the network computing system 290 can transmit a transport invitation to the trip negotiator 245 to service the transport request, which the trip negotiator 245 may accept or decline.

It is contemplated that multiple on-demand transport servicing platforms may be utilized by the AV 200, and therefore multiple transport invitations may be received near simultaneously from multiple network computing systems 290 each managing their own on-demand transport service(s). Thus, if multiple transport invitations are received from multiple computing systems 290, the trip negotiator 245 and/or management system 295 of the AV 200 can select a most desirable transport invitation to accept and reject or cancel the others. It is further contemplated that the AV 200 can operate in an available mode, an on-trip mode, and an unavailable mode for any combination of transport service at any given time (e.g., passenger transport, carpool service, food delivery, package and mail delivery, and the like). Accordingly, the trip negotiator 245 can locally, or in concert with the management system 295, determine which requests and invitations to fulfill for which particular transportation services (e.g., based on actual or projected earnings).

Figure 3:
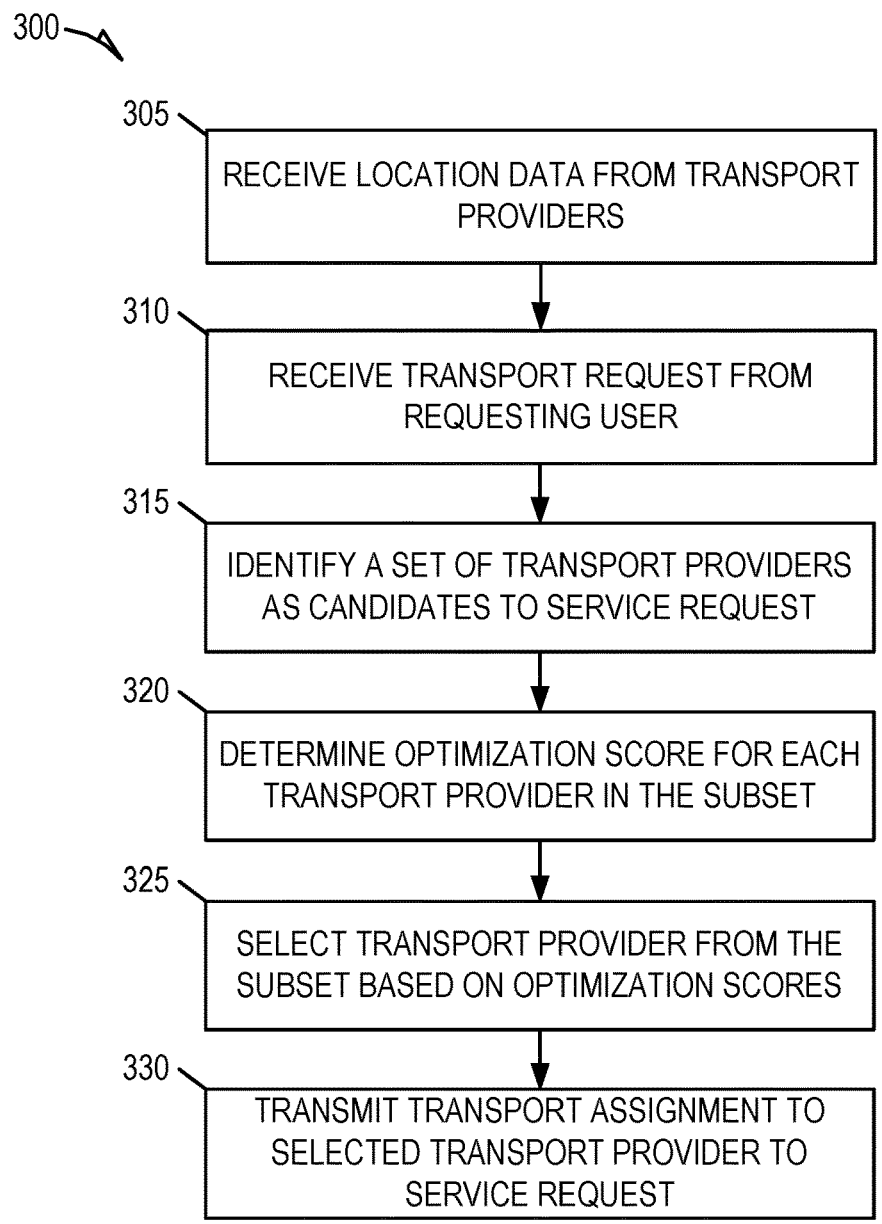
FIGS. 3-5 are flow charts illustrating example operations of a network computing system in performing a method for selecting transport providers to service transport requests based in part on prices proposed by the transport providers for utilization of PDZs in servicing transport requests, according to some embodiments.
Figure 4:
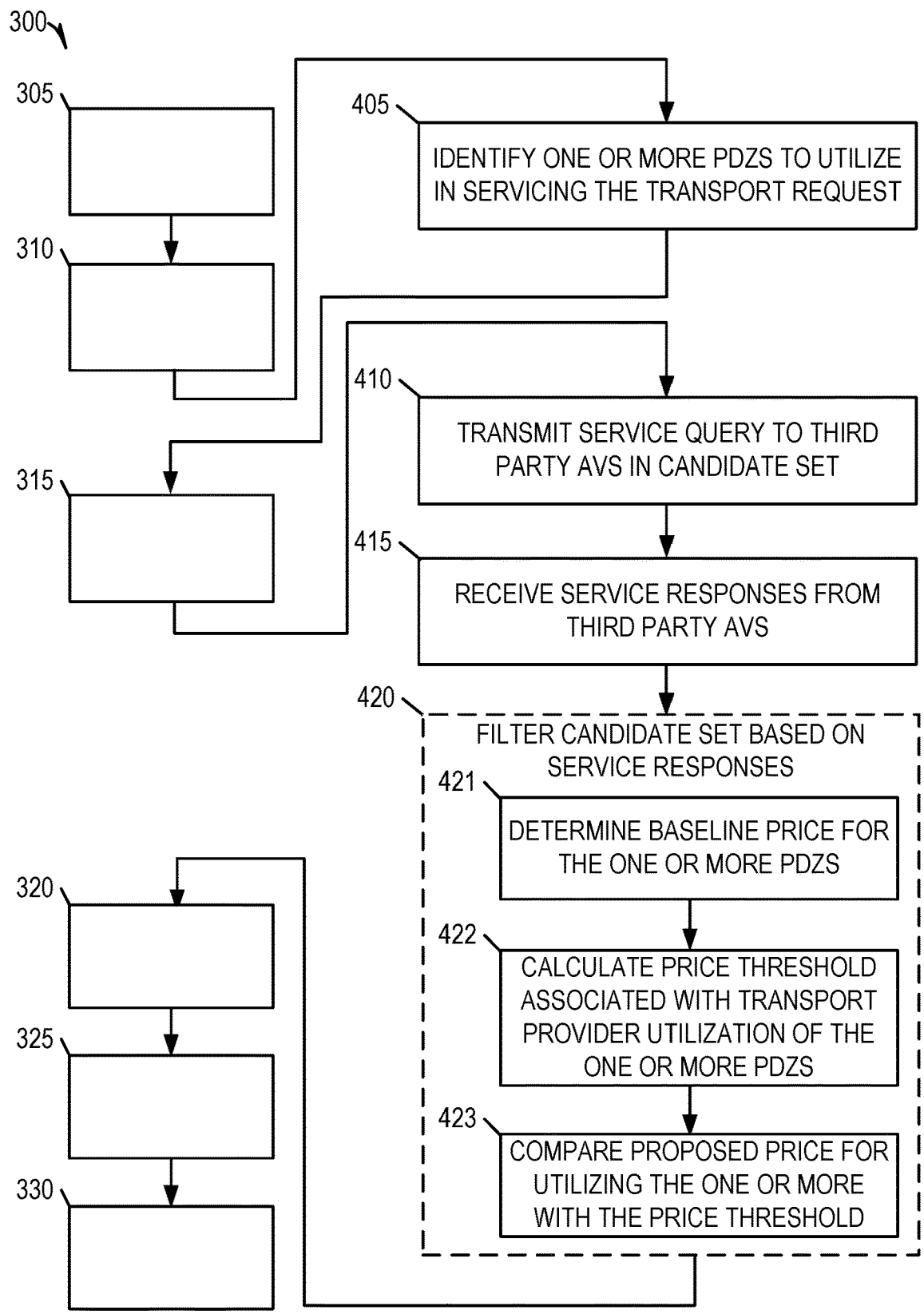
Figure 5:
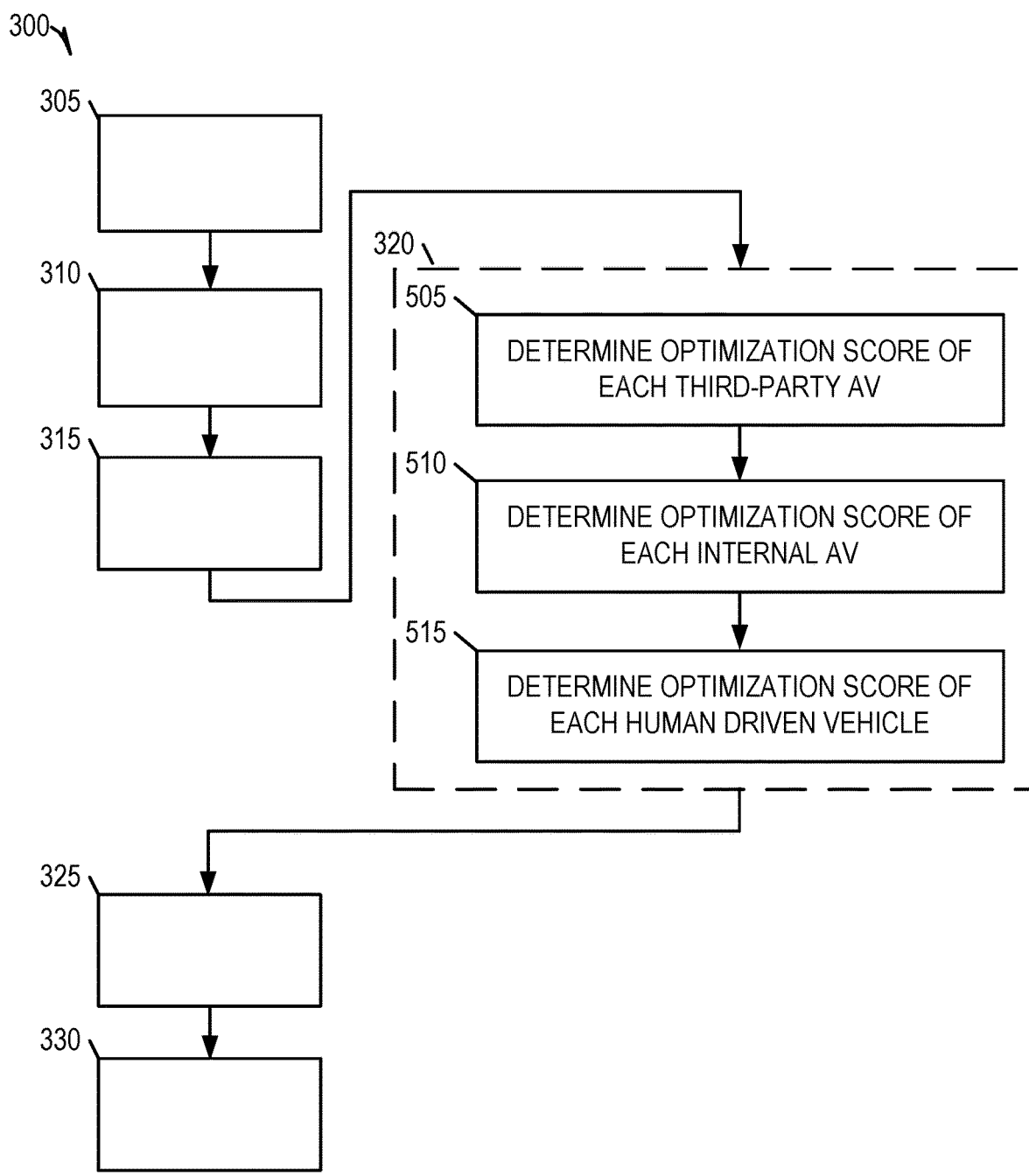

FIGS. 3-5 are flow charts describing an example method 300 of transport providers to service transport requests based in part on prices proposed by the transport providers for PDZ utilization in servicing transport requests, according to examples described herein. Any one or more of the operations of the method 300 may be embodied in computer-readable instructions for execution by a hardware component (e.g., a processor) such that these operations may be performed by one or more components of the network computing system 100. Accordingly, the method 300 is described below, by way of example, with reference thereto. However, it shall be appreciated that the method 300 may be deployed on various other hardware configurations and is not intended to be limited to deployment on the network computing system 100.

At operation 305, the computing system 100 receives location data from transport providers operating throughout a given service region. As described herein the transport providers can comprise any number of human-driven vehicles 194, internal AVs 192, and third-party AVs 196.

At operation 310, the computing system 100 receives a transport request from a user device 185 of a requesting user 180 within the service region. The transport request can indicate a pick-up location or current location of the user 180 and a destination.

At operation 315, the computing system 100 identifies a set of transport providers as candidates to service the transport request. The set of transport providers identified as candidates to service the transport request may comprise a subset of the transport providers that operate throughout the service region. The computing system 100 may identify the set of transport providers based in part on the location data received from the transport providers. For example, the computing system 100 may identify transport providers that are within a predefined threshold distance from the pick-up location indicated in the transport request as candidates to service the transport request. The computing system 100 may further identify transport providers as candidates based on the operational capabilities of the transport providers. For example, the computing system 100 may include transport providers in the candidate set that are capable of servicing the request and utilizing PDZs associated with servicing the request while excluding transport from the candidate set that are incapable of servicing the request or incapable of utilizing the PDZs associated with servicing the request. The computing system 100 may determine whether a transport provider is capable of utilizing a PDZ by comparing operational capabilities of the transport provider with operational constraints associated with utilizing the PDZ indicated in a corresponding PDZ object.

The computing system 100 may, in some embodiments, identify transport providers as candidates based on whether transport providers are permitted to use the one or more PDZs. That is, the computing system 100 may exclude a transport provider from the candidate set if the transport provider is not permitted to use a PDZ identified for usage in servicing the transport request. For example, PDZ objects may include or be tagged with a vehicle, fleet, or vender identifier to indicate that a corresponding vehicle, fleet, or vender is permitted to use the corresponding PDZ. The computing system 100 may utilize this information to identify the candidate set of transport providers such that the candidate set includes only transport providers that are permitted to use the one or more PDZs to be utilized in servicing the request.

At operation 320, the computing system 100 determines an optimization score for each transport provider identified as a candidate to service the transport request. The computing system 100 can determine an optimization score for third-party AVs included in the candidate set based in part on a combination of the proposed cost for completing the transport request and the proposed price to be paid in exchange for utilizing the one or more PDZs in completing the transport request. Further details regarding the computing optimization scores is discussed below in reference to FIG. 5.

Based on the optimization score of each transport provider in the set of candidates, the computing system 100 selects a transport provider to service the transport request, at operation 325. For example, the computing system 100 can rank the transport providers based on the optimization scores, and then select a transport provider (e.g., a transport provider having a highest optimization score) to service the transport request from the ranked set of transport providers.

At operation 330, the computing system 100 transmits a transport assignment to the selected transport provider to enable the transport provider to service the transport request. In certain examples, the transport provider may have the option to accept or decline the transport assignment. In such examples, the computing system 100 may receive a response from the selected transport provider, in which the response can indicate whether the selected transport provider has accepted or declined the transport request. If the transport provider declines, then the computing system 100 can either perform the selection process again from the beginning (starting at operation 315), or can transmit a transport assignment to a next best option in the ranked set. Once accepted, the computing system 100 transmit match data to the accepting transport provider and the requesting user to indicate the match and that an upcoming rendezvous is to be expected.

As shown in FIG. 4, the method 300 may, in some embodiments, further comprise operations 405, 410, 415, and 420. Consistent with some embodiments, the operation 405 may be performed subsequent to operation 310 where the computing system 100 receives the transport request. At operation 405, the computing system 100 identifies one or more PDZs to utilize as part of servicing the transport request. In doing so, the computing system 100 can identify one or more PDZs associated with the pick-up location and one or more PDZs associated with the destination location. In some embodiments, the computing system 100 may identify a PDZ associated with a location based on a distance between the PDZ and the location. For example, the computing system 100 may identify a PDZ associated with a location based on a distance between the PDZ and the location satisfying a threshold distance criterion.

In some embodiments, the computing system 100 may maintain a look-up table that identifies PDZs with predetermined associations with particular locations. Consistent with these embodiments, the computing system 100 may use the look-up table to identify a PDZ associated with a location.

In some embodiments, each PDZ object in the PDZ data 147 may include information describing particular locations that the PDZ is associated with. The computing system 100 may identify a PDZ associated with a location by locating one or more PDZ objects that include an association with the location specified in the request.

Consistent with some embodiments, the identification of a PDZs to utilize in servicing the transport request may include verifying that the PDZ will be or is likely to be available for utilization in servicing the request. Accordingly, the identifying of the one or more PDZs may include verifying an availability of one or more PDZs. In some embodiments, the network computing system 100 may verify the availability of the one or more PDZs based on real-time or near real-time indicia of PDZ availability. As an example, the computing system 100 may verify that a PDZ is available based on an analysis of sensor data obtained from one or more AVs in the area of the PDZ. As another example, the computing system 100 may verify that a PDZ is available based on a user report verifying PDZ availability.

In some embodiments, in verifying PDZ availability, the network computing system 100 may employ a probabilistic model to estimate a likelihood that the one or more PDZs will be available upon the arrival of a transport provider and confirm that the estimated likelihood of availability is greater than a predefined threshold. The probabilistic model may be trained (e.g., in an offline process) using historical data. The historical data may, for example, includes any one or more of: user-generated information (e.g., user generated reports of an occupied or unoccupied PDZ); vehicle driving logs; vehicular sensor logs (e.g., comprising image sensor data, Radar data, Lidar data, etc.); traffic information; public transit schedules; parking restrictions; global position system (GPS) data from one or more vehicles (e.g., known location of one or more stopped vehicles); and parking spot occupancy data obtained from parking meters or other parking sensors. The historical data is analyzed to compute a probabilistic estimation of PDZ availability based on identified features (e.g., patterns) in the data. The training of the probabilistic estimation may include applying one of many known machine learning algorithms to the historical data.

Consistent with these embodiments, the computing system 100 may determine an estimated time of arrival of each transport provider at each PDZ and use respective estimated times of arrival in estimating the likelihood of availability of the corresponding PDZ. The estimated time of arrival of each transport provider at each PDZ may be different and may differ from an estimated time of arrival of the vehicle at the request location. The computing system 100 may determine the estimated time of arrival at a given PDZ based on a current location of a transport provider, a distance between the current location of the transport provider and the PDZ, traffic information, legal restrictions such as speed limits, operational capabilities of the transport provider, and any obstacles in a route from the current location of the transport provider and the PDZ.

In some embodiments, the computing system may determine the estimated time of arrival at a given PDZ based on a route of the transport provider. The route may be determined by the computing system 100 or may be determined by the transport provider. As an example, the computing system 100 can estimate the projected speed of the transport provider over the remainder of its route. The projected speed of the transport provider can be based on the speed limit of the roadways to be traversed to reach the target location, traffic conditions on the roadways to be traversed to reach the target location, and/or other suitable factors.

As shown, the operations 410, 415, and 420, may be performed as part of (e.g., a subroutine or sub-operations) of operation 320 where the computing system 100 determines the candidate set of transport providers.

As shown, the operations 410, 415, and 420, may be performed subsequent to operation 315 where the computing system identifies the candidate set of transport providers. At operation 410, the network computing system 100 transmits a service query to each third-party AV 196 in the candidate set of transport providers. A service query can identify the pick-up location, the one or more PDZs associated with the pick-up location, destination, and the one or more PDZs associated with the destination. A service query may further query a third-party AV 196 for a proposed route, a proposed cost for servicing the transport request, and a proposed price to be paid in exchange for utilizing PDZs in servicing the transport request.

At operation 415, the computing system 100 may then receive service responses from each of the third-party AVs 196 in the candidate subset of transport providers. A service response includes a proposed route, a proposed cost for servicing the transport request, and a proposed price to be paid in exchange for utilizing PDZs in servicing the request. In certain examples, the computing system 100 can implement an auction process for the third-party AVs (e.g., a Dutch auction) to exert downward pressure on the cost of servicing the transport request.

At operation 420, the computing system 100 may filter the candidate set of transport providers based on the received service responses. That is, the computing system 100 may remove one or more third-party AVs from the candidate set based on the received service responses. For example, as shown in FIG. 4, operations 421-423 may be performed as part of the operation 420 (e.g., a sub-operations or a sub-routine). For ease of explanation, operations 421-423 are described below in the context of a single third-party AVs though it shall be appreciated that operations 421-423 may be repeated for each third-party AVs in the in candidate set. At operation 421, the computing system 100 determines a baseline price for utilizing the one or more PDZs. The baseline price may be determined based on information in the PDZ data 147. As noted above, each PDZ object may indicate a minimum expected price for utilizing the PDZ. The minimum expected price may be general or specific to the transport provider. That is, the minimum expected price may vary between transport providers. In some embodiments, the computing system 100 may determine the baseline price by aggregating one or more minimum expected prices.

At operation 422, the computing system 100 calculates a price threshold associated with a particular third-party AV's utilization of the one or more PDZs. The threshold price may be determined based on the baseline price. As an example, the computing system 100 may, in some instances, determine that the baseline price is the price threshold. As another example, the computing system 100 may calculate the threshold price by applying a weighted value to the baseline price. The weighted value may be based on the supply/demand conditions for PDZs in service region or a sub-region, or other such variable conditions.

At operation 423, the computing system 100 compares the proposed price to paid in exchange for the transport provider utilizing the one or more PDZs with the threshold price. If the computing system 100 determines that the proposed price is less than the threshold price, the computing system 100 my remove third-party AV from the candidate set. Otherwise, the computing system 100 maintains the transport provider in the candidate set.

In some embodiments, the computing system 100 may be previously unaware of the operational capabilities of one or more transport providers and as such, the computing system 100 may query these transport providers for their operational capabilities as part of the service query. In these embodiments, a service response may include operational capabilities of the transport provider. Consistent with these embodiments, the computing system 100 may exclude a transport provider from the candidate set based on the operational capabilities of the transport provider. For example, the computing system 100 may remove a transport provider from the candidate set if the transport provider is incapable of servicing the request or incapable of utilizing the PDZs associated with servicing the request. The computing system 100 may determine whether a transport provider is capable of utilizing a PDZ by comparing operational capabilities of the transport provider with operational constraints associated with utilizing the PDZ indicated in a corresponding PDZ object.

As shown in FIG. 5, the method 300 may, in some embodiments, further include operations 505, 510, and 515. Consistent with these embodiments, the operations 505, 510, and 515 may be performed as part of the operation 320 where the computing system 100 determines an optimization score for each transport provider in the candidate set.

At operation 505, the computing system 100 determines an optimization score for each third-party AV in the candidate set. In various examples, the computing system 100 can determine the optimization score of each third-party AV based, at least in part, on a combination of the proposed cost and the proposed price indicated in the service response. For example, the computing system 100 may determine optimization scores based on a profit to the ride-sharing platform generated based on the combination of proposed cost and proposed price. That is, the actual price paid by the requesting user may be different than the proposed cost provided by the transport provider, and the actual price paid to the PDZ provider(s) (e.g., the minimum expected price) may be different than the proposed price to be paid by the transport provider in exchange for utilizing the PDZs of the PDZ provider(s). The differences between these values can produce profits for the ride-sharing platform though the amount vary depending on the proposed price and proposed cost. In determining optimization scores, the computing system 100 may factor the profit of the ride-sharing platform such that the combination of proposed cost for servicing the transport request and the proposed price to be paid in exchange for utilizing a PDZ that maximizes profit of the ride-sharing platform is favored over other combinations. The computing system 100 may attribute a weighted value to a propose cost to service a transport request, a proposed price to be paid in exchange for utilizing PDZs in servicing the request, or a combination of both based on a determined profit arising from these values and factor these weighted values into the optimization score determination.

In an example, the computing system 100 may determine that a requesting user is to pay $5 for a request transport service and may determine that the threshold price to be paid in exchange for utilizing PDZs to complete the transport service is $2. In this example, a first transport provider may propose a cost of $4 for servicing the transport request and propose a price of $3 to be paid in exchange for utilizing the PDZs. A second transport provider may propose a cost of $4.75 for servicing the transport request and propose a price of $3.50 to be paid in exchange for utilizing the PDZs. In this example, selection of the first transport provider would result in a $2 profit ($1 arising from transport provider servicing the request and $1 arising from the transport provider utilizing the PDZ) while selection of the second transport provider would result in a $1.75 profit ($0.25 arising from transport provider servicing the request and $1.50 arising from the transport provider utilizing the PDZ). Consistent with some embodiments, in determining the optimization scores for this first and second transport providers in this example, the computing system 100 may attribute a higher weighted value to the combination of proposed cost of servicing the request and a proposed price to be paid in exchange for utilizing the PDZs of the first transport provider than the combination of proposed price and cost provided by the second transport provider.

The optimization score may further be based on the proposed route included in the service request. For example, the computing system 100 may apply a weighted value to a proposed route based on a distance of the route or an estimate time of travel along the route and factor these weighted values into the optimization score determination.

Additionally, the computing system 100 can determine the optimization score of each third-party AV based on supply-demand parameters described herein. As an example, the computing system 100 can determine the PDZ supply-demand conditions in the sub-region in which the third-party AV is currently located and attribute a weighted value to the sub-region depending on a level of oversupply or undersupply of PDZs in the sub-region. As another example, the computing system 100 can determine the transport supply-demand conditions in the sub-region in which the third-party AV is currently located and attribute a weighted value to the sub-region depending on a level of oversupply or undersupply of the sub-region. The optimization score of the third-party AV can factor in the overall supply/demand effect of moving the third-party AV from its current location to the pick-up location or destination indicated in the transport request including whether such movement would increase or decrease supply/demand conditions associated with PDZs.

At operation 510, the computing system 100 determines an optimization score for each internal AV in the candidate set of transport providers. The computing system 100 can also determine the optimization scores of the internal AVs based on the supply-demand parameters described above. In addition, since the internal AVs are managed by the computing system 100, the computing system 100 may access details of each internal AV, such as which software version(s) the internal AV implements, and the hardware resources of the internal AV (e.g., sensor systems, computing systems, etc.). In various implementations, the computing system 100 can attribute weighted values corresponding to these known AV resources, and factor these weighted values into the optimization score determination. For example, the transport service entity of the common transport service platform managed by the network computing system 100 can attribute business or academic value in testing or confirming software updates, hardware upgrades, and/or feasible routes for its internal AVs. Accordingly, the optimization score for the internal AVs may factor in such indirect values.

At operation 515, the computing system 100 determines an optimization score of each human-driven vehicle in the candidate set. The computing system 100 can determine the optimization score based on the supply-demand parameters described herein, as well as factoring in the predetermined or expected earnings of the driver.

Accordingly, the network computing system 100 can manage and coordinate the on-demand transport servicing platform in the manner(s) described above. In doing so, the network computing system 100 can facilitate third-party AVs 196 on the platform and move transport supply between sub-regions to increase homogeneity in user experience to requesting users 180.

Figure 6:
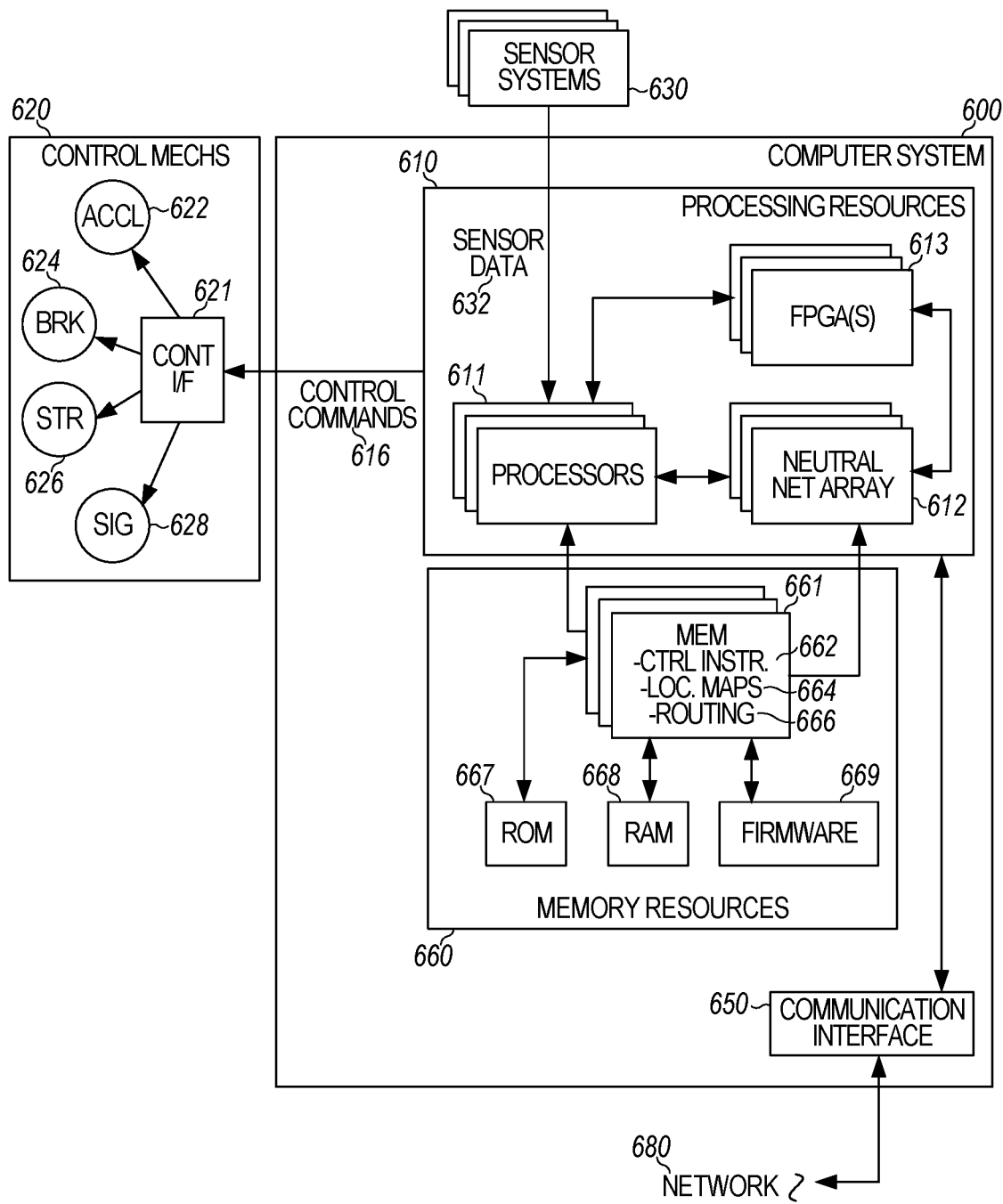
FIG. 6 is a block diagram illustrating a computer system for an AV, according to some embodiments.

FIG. 6 is a block diagram illustrating a computer system upon which example AV processing systems described herein may be implemented. The computer system 500 can be implemented using a number of processing resources 510, which can comprise processors 511, field programmable gate arrays (FPGAs) 513. In some aspects, any number of processors 511 and/or FPGAs 513 of the computer system 500 can be utilized as components of a neural network array 512 implementing one or more machine learning models and utilizing road network maps stored in memory 561 of the computer system 500. In the context of FIG. 2, various aspects and components of the AV control system 220 can be implemented using one or more components of the computer system 500 shown in FIG. 6.

According to some examples, the computer system 500 may be implemented within an autonomous vehicle (AV) with software and hardware resources such as described with examples of FIG. 2. In an example shown, the computer system 500 can be distributed spatially into various regions of the AV, with various aspects integrated with other components of the AV itself. For example, the processing resources 510 and/or memory resources 560 can be provided in a cargo space of the AV. The various processing resources 510 of the computer system 500 can also execute control instructions 562 using microprocessors 511, FPGAs 513, a neural network array 512, or any combination of the same.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system or a remote assistance system (implemented on one or more data centers) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid-state drives.

The memory 661 may also store localization maps 664 in which the processing resources 610—executing the control instructions 662—can continuously compare to sensor data from the various sensor systems 630 of the AV. Execution of the control instructions 662 can cause the processing resources 610 to generate control commands 615 in order to autonomously operate the AV's acceleration 622, braking 624, steering 626, and signaling systems 628 (collectively, the control mechanisms 620). Thus, in executing the control instructions 662, the processing resources 610 can receive sensor data 632 from the sensor systems 630, dynamically compare the sensor data 632 to a current localization map 664, and generate control commands 615 for operative control over the acceleration, steering, and braking of the AV. The processing resources 610 may then transmit the control commands 615 to one or more control interfaces 621 of the control mechanisms 620 to autonomously operate the AV through road traffic on roads and highways, as described throughout the present disclosure.

The memory 661 may also store routing information 666 that the processing resources 610 can utilize to determine routes for the AV to any given destination. In certain examples described herein, the routing information 666 can further be provided to a network computing system 100 to enable the network computing system 100 to select or filter out the AV as a candidate to service transport requests.

Figure 7:
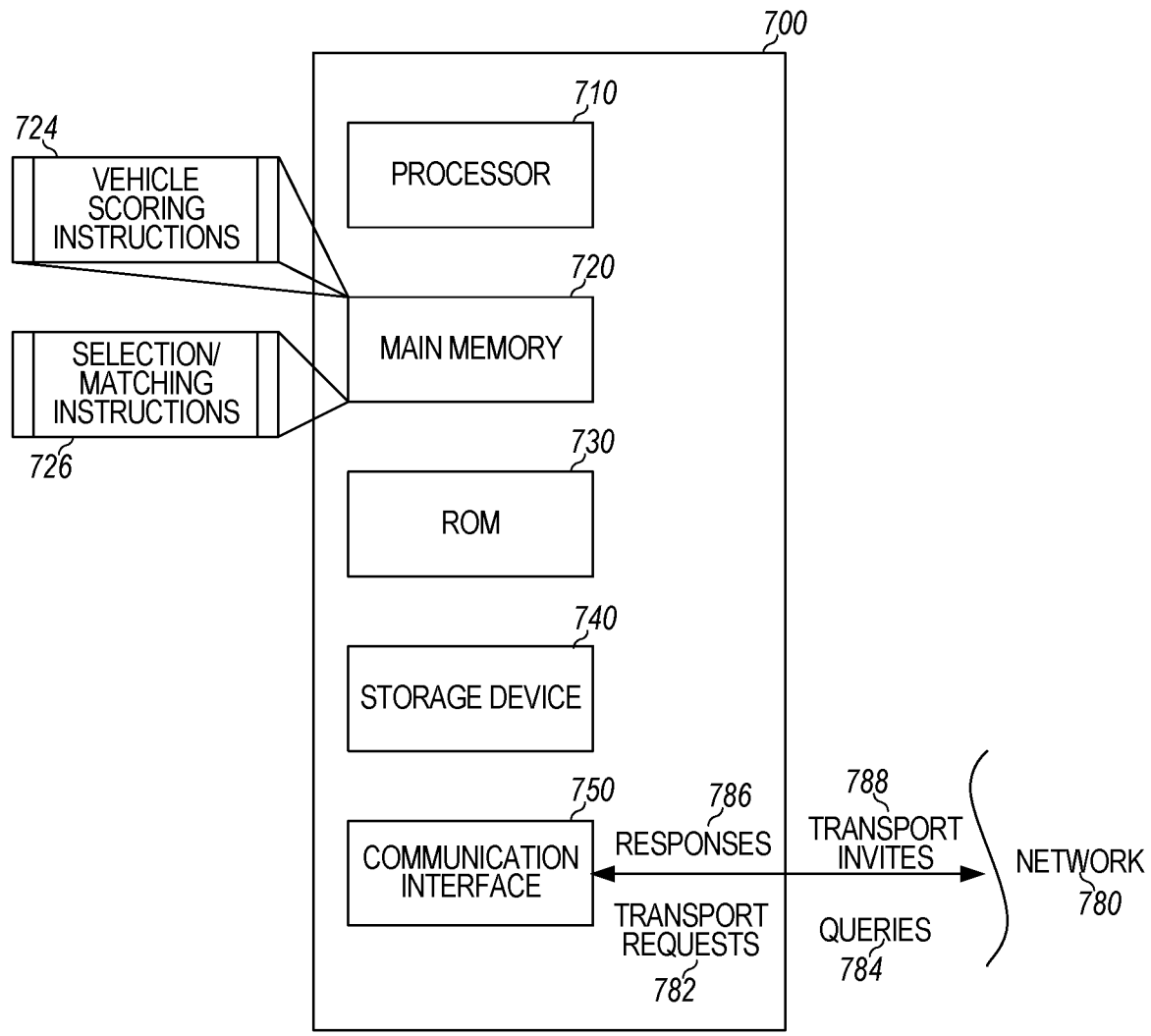
FIG. 7 is a block diagram illustrating a computer system for network computing system managing an on-demand transport servicing platform, upon which examples escribed herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIGS. 1 and 2, the network computing system 100, 290 may be implemented using a computer system 700 such as described by FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random-access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate over one or more networks 780 (e.g., cellular network) through use of the network link (wireless or wired). Using the network link, the computer system 700 can communicate with one or more computing devices, one or more servers, and/or one or more autonomous vehicles. The executable instructions stored in the main memory 720 can include selection and matching instructions 726, which enables the computer system 700 to receive transport requests 782 from drivers and AVs operating throughout the given region. In some aspects, execution of the selection and matching instructions 726 can cause the computer system 700 to identify candidate transport providers, transmit capability queries 784 to those providers, receive capability responses 786, filter the candidate sets, and transmit transport invitations to matched transport providers. The executable instructions stored in the memory 720 can further include vehicle scoring instructions 724, which the processor 710 executes to weigh the various utility metrics of each candidate transport provider, and determine an optimization score for that transport provider. The computing system 700 may then rank and/or select a transport provider to service a given transport request 782 based on the determined optimization scores.

The processor 710 is configured with software and/or other logic to perform one or more processes, steps and other functions described with implementations, such as described with respect to FIGS. 1-4, and elsewhere in the present application. Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-storage media, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

Executable Instructions and Machine Storage Medium

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 724, 726 may be transmitted or received over the network 780 using a transmission medium via a network interface device (e.g., a network interface component included in the communication interface 750) and utilizing any one of a number of well-known transfer protocols (e.g., hypertext transfer protocol (HTTP)). Similarly, the instructions 724, 726 may be transmitted or received using a transmission medium via the coupling (e.g., a peer-to-peer coupling) to the devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 724, 726 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A network computing system comprising:
a communication interface communicating, over one or more networks, with computing devices of requesting users and transport providers throughout a transport service region, the transport providers comprising a set of autonomous vehicles (AVs);
at least one processor of a machine; and
a memory storing instructions that, when executed by the one or more processors, cause the network computing system to perform operations comprising:
receiving, via the communication interface over the one or more networks, a transport request from a requesting user of the transport service region;
identifying a subset of the transport providers as candidates to service the transport request;
selecting a transport provider, from among the subset of the transport providers, by performing operations comprising:
transmitting, via the communication interface, a query to each AV control system of each transport provider requesting a proposed cost to service the transport request and a proposed price to be paid by the transport provider in exchange for utilizing one or more pick-up/drop-off zones (PDZs) in servicing the request;
receiving, via the communication interface from each AV control system, the proposed cost to complete the transport request and the proposed price to be paid in exchange for utilizing one or more PDZs being provided by the transport provider in servicing the request, the receiving of the proposed cost and the proposed price to be paid comprising receiving a first cost and a first price to be paid from a first AV control system of a first transport provider of the subset of the transport providers and receiving a second cost and a second price to be paid from a second AV control system of a second transport provider of the subset of the transport providers; and
selecting, by a transport coordinator included in the network computing system, one of the first or second transport provider as the transport provider based on a first combination of the first cost and the first price received from the first AV control system of the first transport provider and a second combination of the second cost and the second price received from the second AV control system of the second transport provider;
transmitting, via the communication interface over the one or more networks, a transport assignment to the selected transport provider to cause the selected transport provider to service the transport request;
in response to the transport coordinator determining that the selected transport provider accepted the transport assignment, transmitting by the transport coordinator match data to the computing device of the requesting user to facilitate rendezvous between the requesting user and the selected transport provider; and based on the transport assignment, autonomously utilizing one or more sensors of an AV of the selected transport provider to autonomously navigate the AV of the selected transport provider along a route to the one or more PDZs.

2. The network computing system of claim 1, wherein the subset of the transport providers comprises one or more third-party AVs, and wherein the query to each AV control system of each third-party AV of the one or more third-party AVs indicates a pick-up location and a destination and identifies the one or more PDZs; and the operations further comprise:

receiving, via the communication interface over the one or more networks from each AV control system of each third-party AV, a proposed route from the pick-up location to the destination.

3. The network computing system of claim 2, wherein the operations further comprise:

identifying the one or more PDZs associated with servicing the request;

verifying an availability of the one or more PDZs;

wherein the service query identifies the one or more PDZs based on verifying the availability of the one or more PDZs.

4. The network computing system of claim 2, wherein the operations further comprise:

determining an optimization score of each transport provider in the subset based on a plurality of utility metrics;

wherein the transport provider is selected based on the optimization score of each transport provider in the subset.

5. The network computing system of claim 1, wherein the operations further comprise:

verifying that a given PDZ of the one or more PDZs will be available to be utilized by the selected transport provider using a probabilistic model in response to determining that a likelihood associated with the given PDZ being available transgresses a threshold, the probabilistic model comprising a machine learning model that is trained to estimate a likelihood that a set of PDZs will be available upon arrival of a transport provider using historical data, the machine learning model being trained by identifying features from the historical data.

6. The network computing system of claim 4, wherein the plurality of utility metrics comprises transport supply-demand conditions of a current sub-region in which the transport provider is located, and PDZ supply-demand conditions of the current sub-region.

7. The network computing system of claim 4, wherein selecting the transport provider further comprises:

ranking the subset of the transport providers based on the optimization score determined for each transport provider in the subset of transport providers; and wherein the selected transport provider is selected based at least in part on the ranked subset of transport providers.

8. The network computing system of claim 4, wherein the determining of the optimization score of each transport provider in the subset based on a set of service responses comprises:

determining an optimization score of the transport provider based on a combination of the proposed cost to service the transport request and the proposed price to be paid for utilizing one or more PDZs indicated in the service response provided by the transport provider.

9. The network computing system of claim 8, wherein the operations further comprise:

determining the transport provider is capable of utilizing the one or more PDZs based on operational capabilities of the transport provider and operational constraints of the each of the one or more PDZs, the operational constraints comprising at least one of operating in reverse, performing parallel parking, or using particular PDZ geometries or dimensions;

wherein the transport provider is selected based in part on determining the transport provider is capable of utilizing the one or more PDZs.

10. The network computing system of claim 9, wherein the determining of the optimization score for the transport provider comprises:

comparing the proposed price indicated in the service response with a price threshold associated with the transport provider utilizing the one or more PDZs.

11. The network computing system of claim 10, wherein the operations further comprise:

calculating the price threshold associated with the transport provider utilizing the one or more PDZs based on a baseline price associated with utilizing the one or more PDZs; and determining availability of a first PDZ of the one or more PDZs by analyzing sensor data obtained from one or more AVs that are in an area associated with the first PDZ.

12. A computer-implemented method comprising:

receiving, via a communication interface over one or more networks, a transport request from a computing device of a requesting user of a transport service region;

determining, from a set of transport providers in the transport service region, a subset of transport providers as candidates to service the transport request, the transport providers comprising a set of autonomous vehicles (AVs);

selecting, by one or more hardware processors of a machine, a transport provider, from among the subset of the transport providers, by performing operations comprising:

transmitting, via the communication interface, a query to each AV control system of each transport provider requesting a proposed cost to service the transport request and a proposed price to be paid by the transport provider in exchange for utilizing one or more pick-up/drop-off zones (PDZs) in servicing the request;

receiving, via the communication interface from each AV control system, the proposed cost to complete the transport request and the proposed price to be paid in exchange for utilizing one or more PDZs being provided by the transport provider in servicing the request, the receiving of the proposed cost and the proposed price to be paid comprising receiving a first cost and a first price to be paid from a first AV control system of a first transport provider of the subset of the transport providers and receiving a second cost and a second price to be paid from a second AV control system of a second transport provider of the subset of the transport providers; and selecting, by a transport coordinator included in the network computing system, one of the first or second transport provider as the transport provider based on a first combination of the first cost and the first price received from the first AV control system of the first transport provider and a second combination of the second cost and the second price received from the second AV control system of the second transport provider;

transmitting, via the communication interface over the one or more networks, a transport assignment to the selected transport provider to cause the selected transport provider to service the transport request;

in response to the transport coordinator determining that the selected transport provider accepted the transport assignment, transmitting by the transport coordinator match data to the computing device of the requesting user to facilitate rendezvous between the requesting user and the selected transport provider; and based on the transport assignment, autonomously utilizing one or more sensors of an AV of the selected transport provider to autonomously navigate the AV of the selected transport provider along a route to the one or more PDZs.

13. The computer-implemented method of claim 12, further comprising obtaining a classification of each of the transport providers indicating that a first of the transport providers is an internal AV, a second of the transport providers is an internal AV third-party AV, and a third of the transport providers is a human driven vehicle.

14. The computer-implemented method of claim 13, wherein the selected transport provider is associated with a first classification, further comprising:

determining that the selected transport provider fails to accept the transport assignment;

in response to determining that the selected transport provider fails to accept the transport assignment, transmitting the transport assigned to a second transport provider in the subset of the transport providers that is associated with a second classification; and in response to determining that the second transport provider fails to accept the transport assignment, transmitting the transport assigned to a human driver.

15. The computer-implemented method of claim 14, further comprising:

determining an optimization score of each transport provider in the subset based on a plurality of utility metrics.

16. The computer-implemented method of claim 14, further comprising:

determining an optimization score of the transport provider based on a combination of the proposed cost to service the transport request and the proposed price to be paid for utilizing one or more PDZs indicated in a service response provided by the transport provider.

17. The computer-implemented method of claim 16, wherein the determining of the optimization score for the transport provider comprises:

identifying one or more PDZs that are associated with the transport request; and determining whether the one or more PDZs are usable by the transport provider based on data describing each of the one or more PDZs and information associated with the transport provider.

18. The computer-implemented method of claim 17, wherein determining whether the one or more PDZs are usable by the transport provider comprises:

comparing operational capabilities of the transport provider with operational constraints of the each of the one or more PDZs, the comparing comprising:

obtaining the operational capabilities of each of transport provider in the subset of the transport providers;

accessing the operational constraints of each of the one or more PDZs;

determining that the operational capabilities of a first transport provider in the subset of the transport providers is capable of utilizing the one or more PDZs with the operational constraints; and determining that the operational capabilities of a second transport provider in the subset of the transport providers is incapable of utilizing the one or more PDZs with the operational constraints.

19. The computer-implemented method of claim 12, further comprising:

associating a set of PDZs and a set of AVs using registration data; and determining that a first transport provider in the subset of transport providers is associated with a given one of the one or more PDZs in response to determining that the first transport provider is in the set of AVs associated with the given one of the one or more PDZs that is in the set of the PDZs associated.

20. A tangible computer-readable medium storing instructions that, when executed by one or more processors of a machine, cause the one or more processors of the machine to perform operations comprising:

receiving, via a communication interface over one or more networks, a transport request from a computing device of a requesting user of a transport service region;

determining, from a set of transport providers in the transport service region, a subset of transport providers as candidates to service the transport request, the transport providers comprising a set of autonomous vehicles (AVs);

selecting, by one or more hardware processors of a machine, a transport provider, from among the subset of the transport providers, by performing operations comprising:

transmitting, via the communication interface, a query to each AV control system of each transport provider requesting a proposed cost to service the transport request and a proposed price to be paid by the transport provider in exchange for utilizing one or more pick-up/drop-off zones (PDZs) in servicing the request;

receiving, via the communication interface from each AV control system, the proposed cost to complete the transport request and the proposed price to be paid in exchange for utilizing one or more PDZs being provided by the transport provider in servicing the request, the receiving of the proposed cost and the proposed price to be paid comprising receiving a first cost and a first price to be paid from a first AV control system of a first transport provider of the subset of the transport providers and receiving a second cost and a second price to be paid from a second AV control system of a second transport provider of the subset of the transport providers; and selecting, by a transport coordinator included in the network computing system, one of the first or second transport provider as the transport provider based on a first combination of the first cost and the first price received from the first AV control system of the first transport provider and a second combination of the second cost and the second price received from the second AV control system of the second transport provider;
    transmitting, via the communication interface over the one or more networks, a transport assignment to the selected transport provider to cause the selected transport provider to service the transport request;
    in response to the transport coordinator determining that the selected transport provider accepted the transport assignment, transmitting by the transport coordinator match data to the computing device of the requesting user to facilitate rendezvous between the requesting user and the selected transport provider; and
    based on the transport assignment, autonomously utilizing one or more sensors of an AV of the selected transport provider to autonomously navigate the AV of the selected transport provider along a route to the one or more PDZs.

\* \* \* \* \*

UNITED STATES PATENT AND TRADEMARK OFFICE
CERTIFICATE OF CORRECTION

| | |
|---|---|
| PATENT NO. | : 11,829,904 B2 |
| APPLICATION NO. | : 16/948484 |
| DATED | : November 28, 2023 |
| INVENTOR(S) | : Niemiec et al. |

It is certified that error appears in the above-identified patent and that said Letters Patent is hereby corrected as shown below:

In the Claims

In Column 26, Line 60, in Claim 1, after "transport", delete a linebreak

In Column 29, Line 8, in Claim 12, after "transport", delete a linebreak

In Column 31, Line 2, in Claim 20, after "transport", delete a linebreak

Signed and Sealed this
Thirteenth Day of February, 2024

Katherine Kelly Vidal
*Director of the United States Patent and Trademark Office*